United States Patent [19]

Madaliev et al.

[11] 4,254,245
[45] Mar. 3, 1981

[54] METHOD FOR PREPARING FURAN-EPOXY POWDER-LIKE BINDER

[76] Inventors: Shavkat Madaliev, ulitsa Yarmazar, 361; Gennady D. Varlamov, ulitsa Jubileinaya, 5, kv. 13; Ildgam A. Bekbulatov, ulitsa Kashkarskaya, 215; Juldash Mamatov, ulitsa Pushkina, 50, kv. 60, all of Fergana, U.S.S.R.

[21] Appl. No.: 969,510

[22] Filed: Dec. 14, 1978

[51] Int. Cl.³ ............................................ C08F 283/10
[52] U.S. Cl. .................................... 525/529; 525/410; 525/417; 525/934
[58] Field of Search ................ 260/829; 525/529, 410, 525/417

[56] References Cited

U.S. PATENT DOCUMENTS

| | | | |
|---|---|---|---|
| 3,366,595 | 1/1968 | Dereich | 260/829 |
| 3,491,041 | 1/1970 | Dornte | 260/829 |
| 4,145,369 | 3/1979 | Hira | 260/829 |

FOREIGN PATENT DOCUMENTS

| | | |
|---|---|---|
| 305169 | 6/1971 | U.S.S.R. |
| 322343 | 11/1971 | U.S.S.R. |
| 533618 | 10/1976 | U.S.S.R. |

*Primary Examiner*—Paul Lieberman
*Attorney, Agent, or Firm*—Ladas & Parry

[57] ABSTRACT

A method for preparing a furan-epoxy powder-like binder which comprises interaction of an epoxy diane resin with a nitrogen-containing furan monomer, such as furfuramide or 3-methyl-5-furylpyrazoline at a temperature ranging from 140° to 160° C. at a ratio of the nitrogen-containing furan monomer to the epoxy diane resin equal to 0.2:5 to 3.4:5 expressed in parts by weight. The process may be performed in the presence of trifurylborate at the weight ratio thereof to the epoxy diane resin equal to 0.05:5 to 0.6:5 expressed in parts by weight. The resulting product is cooled to a temperature of not more than 30° C. and then disintegrated to a powder-like state. The furane epoxy binder prepared by the method according to the present invention does not get clogged for 45 days and may be stored for long periods of up to 6 months without any changes in its initial properties. Vicat deformation heat-resistance of the polymeric material produced with the use of said binder is as high as 230° C. Polymeric materials prepared with the binder according to the present invention may be both inflammable and non-inflammable or possess the ability of self-extinguishing.

4 Claims, No Drawings

METHOD FOR PREPARING FURAN-EPOXY POWDER-LIKE BINDER

FIELD OF APPLICATION

The present invention relates to the preparation of powder-like furan-epoxy resins based on resins obtained as polycondensation products of epichlorohydrin with diphenylolpropane (such resins sometimes being referred to as epoxy diane resins) and a nitrogen-containing furan monomer. Such binders are intended for the manufacture of spraying-produced protective coatings, laminates, foamed plastics, moulding compositions as well as for other applications.

BACKGROUND OF THE INVENTION

Known in the art in USSR Inventor's Certificate No. 533618 is a method for preparing an epoxy-furan powder-like binder by reacting an epoxy diane resin with difurfurylideneacetone and a nitrogen-containing furan monomer, i.e. furfuramide, at the temperature of 140° C., the components being taken in the following proportions, parts by weight:

epoxy diane resin: 100
difurfurylideneacetone: 50 to 150
furfuramide: 95 to 100;

the resulting product is cooled to a temperature of at most 30° C. and ground to a powder-like condition.

The binder prepared by this prior art method features but an increased clogging (becomes clogged even after 30 days) and cannot be stored for long period without loss of its initial properties (solubility and metability), i.e. not longer than 3 months. Furthermore, deformation heat-resistance of polymeric materials produced from said furan-epoxy powder-like binder does not exceed 208° C. according to Vicat. Besides, polymeric materials prepared from said binder are inflammable. These disadvantages restrict the field of application of said furan-epoxy powder-like binder.

SUMMARY OF THE INVENTION

It is an object of the present invention to provide such a method which would make it possible to prepare a furan-epoxy powder-like binder having an increased non-clogging ability.

It is another object of the present invention to provide such a method which would make it possible to obtain a furan-epoxy powder-like binder capable of being stored for long periods without deterioration of its initial properties.

It is still another object of the present invention to increase a deformation heat-resistance of polymeric materials produced from said furan-epoxy powder-like binder.

It is a further object of the present invention to impart, to polymeric materials based on said furan-epoxy powder-like binder, a non-inflammability or self-extinguishing ability.

These and other objects of the present invention are accomplished by a method for preparing a furan-epoxy powder-like binder by reacting a resin obtained from the diglycidyl ether of bisphenol A with a nitrogen-containing furan monomer upon heating followed by cooling the resulting product to a temperature of at most 30° C. and grinding to a powder-like condition, wherein, in accordance with the present invention as the nitrogen-containing furan monomer use is made of furfuramide or 3-methyl-5-furylpyrazoline and the reaction is conducted at a temperature within the range of from 140° to 160° C. at a ratio between the nitrogen-containing and the resin obtained from the diglycidyl ether of bisphenol A expressed in weight parts ranging from 0.2:5 to 3.4:5.

In the case of using 3-methyl-5-furylpyrazoline as the nitrogen-containing furan monomer, it is advisable to perform the reaction of the epoxy furan resin with 3-methyl-5-furylpyrazoline at a temperature within the range of from 150° to 160° C. and at a ratio (expressed in parts by weight) between 3-methyl-5-furylpyrazoline and the epoxy diane resin of from 1:5 to 3:5.

The method according to the present invention makes it possible to prepare a furan-epoxy powder-like binder which is not liable to clogging for 45 days and capable of being stored for long periods up to 6 months without deterioration of its initial properties. Deformation heat-resistance of polymeric materials prepared with said binder is as high as 230° C. according to Vicat.

It is advisable to react said components in the presence of trifurylborate in a ratio thereof to the epoxy diane resin expressed in parts by weight of from 0.05:5 to 0.6:5. In this case a furan-epoxy binder is obtained which gives non-inflammable or self-extinguishing polymeric materials.

The method is technologically simple and does not necessitate the use of a complicated process equipment. It enables the preparation of the desired product at a high yield thereof, i.e. up to 92%.

DETAILED DESCRIPTION OF THE INVENTION

The method according to the present invention is performed in the following manner.

Into a reactor provided with a heating means, reflux condenser, thermometer and a stirrer, there are charged in specified proportions a resin obtained from the diglycidyl ether of bisphenol A, a nitrogen-containing furan monomer, i.e. furfuramide or 3-methyl-5-furylpyrazoline, and, when necessary, trifurylborate. Then temperature in the reactor is elevated to 140°–160° C. and the process is carried out at this temperature for a period of 1 to 1.5 hour. The resulting furan-epoxy binder is discharged from the reactor into a pan, cooled to a temperature of at most 30° C., e.g. to room temperature, and subjected to grinding to a powder-like condition with a predetermined size of particles (depending on the end use of the binder). It is inadvisable to cool the binder to a temperature above 30° C., since in this case the binder particles adhere to the parts of the grinding means during the grinding.

For a better understanding of the present invention some specific Examples are given hereinbelow by way of illustration. Properties of the resulting furan-epoxy binder and polymers prepared therewith are shown in Tables 1 and 2 respectively after the Examples.

EXAMPLE 1

Into a reactor provided with a heating means, reflux condenser, thermometer and a stirrer there are charged 700 g of a resin obtained from the diglycidyl ether of bisphenol A (polycondensation product of epichlorohydrin and diphenylolpropane) with the number of epoxy groups of 22–24% and 28 g of furfuramide. The ratio between said components in parts by weight is 5:0.2 respectively. Temperature in the reactor is elevated to 160° C. and the process is conducted at this temperature for 1.5 hour. The resulting furan-epoxy binder (the yield is equal to 92%) is discharged from the reactor, cooled to the temperature of 20° C. and ground to a powder-like condition with a predetermined particle size.

EXAMPLE 2

Into a reactor similar to that described in the foregoing Example 1 there are charged 700 g of resin obtained from the diglycidyl ether of bisphenol A with the number of epoxy groups of 20–22% and 140 g of furfuramide. The ratio between said components expressed in parts by weight is 5:1 respectively. Temperature in the reactor is elevated to 145° C. and the process is conducted at this temperature for 1.3 hour. The resulting furan-epoxy binder (the yield is equal to 90%) is discharged from the reactor, cooled to 25° C. and then ground to a powder-like condition.

EXAMPLE 3

Into the reactor described in the foregoing Example 1 there are charged 700 g of a resin obtained from the diglycidyl ether of bisphenol A with the number of epoxy groups of 18–20% and 350 g of furfuramide. The ratio between said components expressed in parts by weight is equal to 5:2.5 respectively. The process is conducted at the temperature of 145° C. for 1.2 hour. The resulting furan-epoxy binder (the yield is equal to 88%) is discharged from the reactor, cooled to the temperature of 30° C. and ground to a powder-like condition.

EXAMPLE 4

Into the reactor described in Example 1 hereinbefore there are charged 700 g of a resin obtained from the diglycidyl ether of bisphenol A with the number of epoxy groups of 16–18% and 450 g of furfuramide. The ratio between said components expressed in parts by weight is equal to 5:3.2 respectively. The process is conducted at the temperature of 140° C. for 1.2 hour. The resulting furan-epoxy binder (the yield is equal to 88%) is discharged from the reaction, cooled to the temperature of 25° C. and ground to a powder-like condition.

EXAMPLE 5

Into the reactor described in Example 1 hereinbefore there are charged 700 g of a resin obtained from the diglycidyl ether of bisphenol A with the number of epoxy groups of 14–16% and 476 g of furfuramide. The ratio between said components expressed in parts by weight is equal to 5:3.4 respectively. The process is conducted at the temperature of 140° C. for one hour. The resulting product (the yield is 90%) is discharged from the reactor, cooled to the temperature of 15° C. and ground to a powder-like condition.

EXAMPLE 6

Into the reactor described in the foregoing Example 1 there are charged 700 g of resin obtained from the diglycidyl ether of bisphenol A with the number of epoxy groups of 22–24% and 28 g of 3-methyl-5-furylpyrazoline. The ratio between said components expressed in parts by weight is 5:0.2 respectively. The process is conducted at the temperature of 160° C. for 1.5 hour. The resulting product (the yield is equal to 92%) is discharged from the reactor, cooled to the temperature of 20° C. and ground to a powder-like condition.

EXAMPLE 7

Into the reactor described in the foregoing Example 1 there are charged 700 g of resin obtained from the diglycidyl ether of bisphenol A with the number of epoxy groups of 20–22% and 140 g of 3-methyl-5-furylpyrazoline. The ratio between said components expressed in parts by weight is equal to 5:1 respectively. The process is conducted at the temperature of 160° C. for 1.5 hour. The resulting product (the yield is equal to 90%) is discharged from the reactor, cooled to the temperature of 25° C. and disintegrated to a powder-like state.

EXAMPLE 8

Into the reactor described in the foregoing Example 1 there are added 700 g of a resin obtained from the diglycidyl ether of bisphenol A with the number of epoxy groups of 18–20% and 350 g of 3-methyl-5-furylpyrazoline. The ratio between said components is equal to 5:2.5 respectively. The process is conducted at the temperature of 155° C. for 1.3 hour. The resulting product (the yield is equal to 88%) is discharged from the reactor, cooled to the temperature of 30° C. and disintegrated to a powder-like condition.

EXAMPLE 9

Into the reactor described in Example 1 hereinbefore there are charged 700 g of a resin obtained from the diglycidyl ether of bisphenol A with the number of epoxy groups of 16–18% and 420 g of 3-methyl-5-furylpyrazoline. The ratio between said components expressed in parts by weight is equal to 5:3 respectively. The process is conducted at the temperature of 150° C. for 1.5 hour. The resulting product (the yield is equal to 90%) is discharged from the reactor and disintegrated, after cooling to 15° C., to a powder-like condition.

EXAMPLE 10

Into the reactor described in Example 1 hereinbefore, there are charged 700 g of a resin obtained from the diglycidyl ether of bisphenol A with the number of epoxy groups of 14–16% and 450 g of 3-methyl-5-furylpyrazoline. The ratio between said components is equal to 5:3.2 respectively (expressed in parts by weight). The process is conducted at the temperature of 145° C. for 1.2 hour. The resulting product (the yield is equal to 92%) is discharged from the reactor, cooled to the temperature of 20° C. and disintegrated to a powder-like condition.

EXAMPLE 11

Into the reactor described in Example 1 hereinbefore there are charged 700 g of a resin obtained from the diglycidyl ether of bispheonl A with the number of epoxy groups of 18–20% and 476 g of 3-methyl-5-furylpyrazoline. The ratio between said components is equal to 5:3.4 respectively. The process is conducted at the temperature of 140° C. for one hour. The resulting product (the yield thereof is equal to 90%) is discharged from the reactor, cooled to the temperature of 20° C. and disintegrated to a powder-like condition.

EXAMPLE 12

The process is performed in a manner similar to that described in Example 1 hereinbefore, with the only exception that into the starting mixture of the components there are added 7 g of trifurylborate. The ratio between trifurylborate and the resin obtained from the diglycidyl ether of the bisphenol A is equal to 0.05:5. The yield of the resulting product is equal to 92%.

EXAMPLE 13

The process is conducted following the procedure described in the foregoing Example 2, with the only exception that into the starting mixture of the components there are added 28 g of trifurylborate. The ratio between trifurylborate and the resin obtained from the diglycidyl ether of bisphenol A is equal to 0.2:5. The yield of the resulting product is equal to 91%.

EXAMPLE 14

The process is conducted in a manner similar to that described in Example 3 hereinbefore, with the only exception that into the starting mixture of the components there are added 42 g of triflurylborate. The ratio between trifurylborate and the resin obtained from the diglycidyl ether of bisphenol A is equal to 0.3:5. The yield of the resulting product is equal to 89%.

EXAMPLE 15

The process is conducted in a manner similar to that described in Example 6 hereinbefore with the only exception that into the starting mixture of the components there are added 7 g of trifurylborate. The ratio between trifurylborate and the resin obtained from the diglycidyl ether of the bisphenol A is equal to 0.05:5. The yield of the resulting product is equal to 92%.

EXAMPLE 16

The process is conducted in a manner similar to that described in Example 7 hereinbefore with the only exception that into the starting mixture of the components there are added 28 g of trifurylborate. The ratio between trifurylborate and the resin obtained from the diglycidyl ether of bisphenol A is equal to 0.2:5. The yield of the resulting product is equal to 90%.

EXAMPLE 17

The process is conducted in a manner similar to that described in the foregoing Example 8, except that into the starting mixture of the components there are gadded 42 g of trifurylborate. The ratio between trifurylborate and the resin obtained from the diglycidyl ether of bisphenol A is equal to 0.3:5. the yield of the resulting product is equal to 89%.

EXAMPLE 18

The process is conducted following the procedure of Example 4 hereinbefore, with the only exception that into the starting mixture of the components there are added 70 g of trifurylborate. The ratio between trifurylborate and the resin obtained from the diglycidyl ether of bisphenol A is equal to 0.5:5. The yield of the resulting product is equal to 88%.

EXAMPLE 19

The process is conducted following the procedure of Example 5 hereinbefore, with the only exception that into the starting mixture of the components there are added 84 g of trifurylborate. The ratio between trifurylborate and the resin obtained from the diglycidyl ether of bisphenol A is equal to 0.6:5. The yield of the resulting product is equal to 90%.

EXAMPLE 20

The process is conducted in a manner similar to that described in the foregoing Example 10, except that into the starting mixture of the components there are added 70 g of trifurylborate. The ratio between trifurylborate and the resin obtained from the diglycidyl ether of bisphenol A is equal to 0.5:5. The yield of the resulting product is equal to 92%.

EXAMPLE 21

The process is conducted following the procedure described in Example 11 hereinbefore, with the only exception that into the starting mixture of the components there are added 84 g of trifurylborate. The ratio between trifurylborate and the resin obtained from the diglycidyl ether of bisphenol A is equal to 0.6:5. The yield of the resulting product is equal to 90%.

In the following Table 1 there are shown the properties of the furan-epoxy powder-like binder prepared by the method according to the present invention as described in the foregoing Examples 1 to 21 and by the prior art method.

TABLE 1

| Furan-epoxy powder-like binder prepared by the method of the invention as described in | Properties | | | | | |
|---|---|---|---|---|---|---|
| | Appearance | M.p., °C. | Ubbelohde drop point, °C. | Solubility in acetone | Content of epoxy groups, % | Stability upon storage, months | Non-clogging powder, days |
| 1 | 2 | 3 | 4 | 5 | 6 | 7 | 8 |
| Example 1 | Light- | 85 | 109 | Total | 4.5 | 6 | 35 |
| Example 2 | brown | 83 | 107 | " | 2.8 | 6 | 40 |
| Example 3 | to | 88 | 118 | " | 2.6 | 6 | 40 |
| Example 4 | dark- | 82 | 104 | " | 2.0 | 6 | 45 |
| Example 5 | brown | 90 | 120 | " | 1.7 | 6 | 35 |
| Example 6 | powder | 78 | 98 | " | 4.3 | 6 | 40 |
| Example 7 | | 86 | 102 | " | 3.2 | 6 | 45 |
| Example 8 | | 92 | 114 | " | 2.9 | 6 | 45 |
| Example 9 | | 88 | 110 | " | 2.3 | 6 | 45 |
| Example 10 | | 76 | 106 | " | 2.0 | 6 | 40 |
| Example 11 | | 75 | 103 | " | 1.8 | 6 | 35 |
| Example 12 | | 86 | 111 | " | 4.1 | 6 | 40 |
| Example 13 | | 83 | 108 | " | 3.7 | 6 | 40 |
| Example 14 | | 87 | 115 | " | 2.8 | 6 | 45 |
| Example 15 | | 84 | 108 | " | 4.0 | 6 | 40 |
| Example 16 | | 90 | 120 | " | 3.2 | 6 | 45 |
| Example 17 | | 79 | 110 | " | 2.5 | 6 | 35 |

TABLE 1-continued

| Furan-epoxy powder-like binder prepared by the method of the invention as described in | Appearance | M.p., °C. | Ubbelohde drop point, °C. | Solubility in acetone | Content of epoxy groups, % | Stability upon storage, months | Non-clogging powder, days |
|---|---|---|---|---|---|---|---|
| 1 | 2 | 3 | 4 | 5 | 6 | 7 | 8 |
| Example 18 | | 85 | 108 | " | 2.3 | 6 | 40 |
| Example 19 | | 91 | 123 | " | 1.8 | 6 | 40 |
| Example 20 | | 87 | 105 | " | 2.6 | 6 | 40 |
| Example 21 | | 75 | 102 | " | 1.9 | 6 | 45 |
| Binder prepared by the prior art method | Dark-brown powder | 92 | 114 | " | — | 3 | 30 |

The properties of polymers produced with the use of the furan-epoxy powder-like binder prepared by the method according to the present invention are illustrated in the following Table 2. A polymer based on the binder prepared with the use of furfuramide is produced by curing of the binder at a temperature within the range of from 120° to 200° C. with the pause of 6 hours after every 20° C. A polymer based on the binder prepared with the use of 3-methyl-5-furylpyrazoline is produced by curing the binder in a manner similar to that described hereinabove.

TABLE 2

| Properties | Value | |
|---|---|---|
| | Polymer based on the binder prepared with the use of furfuramide | Polymer based on the binder prepared with the use of 3-methyl-5-furylpyrazoline |
| Vicat deformation heat-resistance,°C. | 130–230 | 202–230 |
| Ultimate compression strength, kgf/cm$^2$ | 900–1,500 | 950–1,650 |
| Ultimate strength upon static bending, kgf/cm$^2$ | 250–300 | 300–370 |
| Brinnel hardness, kgf/cm$^2$ | 1600–3000 | 2000–3500 |
| Coke number, % | 47–56 | 49–58 |
| Dielectric loss angle at 50 Hz, at the temperature of 20° C. | $27.10^{-3}$–$30.10^{-3}$ | $28.10^{-3}$–$32.10^{-3}$ |
| Chemical resistance against: | | |
| alkalis | resistant | resistant |
| acids | resistant | resistant |
| Inflammability of a polymer based on: | | |
| binder of Examples 1 to 5 | inflammable | — |
| binder of Examples 6 to 11 | — | inflammable |
| binder of Examples 12 to 14 | capable of self-extinction | — |
| 1 | 2 | 3 |

TABLE 2-continued

| Properties | Value | |
|---|---|---|
| | Polymer based on the binder prepared with the use of furfuramide | Polymer based on the binder prepared with the use of 3-methyl-5-furylpyrazoline |
| Binder of Examples 15 to 17 | — | capable of self-extinction |
| Binder of Examples 18 to 19 | non-inflammable | — |
| Binder of Examples 20 and 21 | — | Non-inflammable |

What is claimed is:

1. A method for preparing a furan-epoxy powder-like binder comprising reacting a resin obtained from the diglycidyl ether of bisphenol A with a nitrogen-containing furan monomer selected from the group consisting of furfuramide and 3-methyl-5-furylpyrazoline at a temperature ranging from 140° to 160° C. at a ratio between said nitrogen-containing furan monomer and said resin obtained from the diglycidyl ether of bisphenol A ranging from 0.2:5 to 3.4:5, followed by cooling of the resulting product to a temperature of not more than 30° C. and grinding said product to a powder-like condition.

2. A method as claimed in claim 1, wherein in the case of using 3-methyl-5-furylpyrazoline as the nitrogen-containing furan monomer, the reaction of said resin obtained from the diglycidyl ether of bisphenol A with 3-methyl-5-furylpyrazoline is carried out at a temperature ranging from 150° to 160° C. at a ratio between 3-methyl-5-furylpyrazoline and said epoxy diane resin ranging from 1:5 to 3:5 respectively as expressed in parts by weight.

3. A method as claimed in claim 1, wherein the reaction of said components is carried out in the presence of trifurylborate at a weight ratio thereof to said resin obtained from the diglycidyl ether of bisphenol A ranging from 0.05:5 to 0.6:5 as expressed in parts by weight.

4. A method as claimed in claim 2, wherein the reaction of said components is carried out in the presence of trifurylborate at a weight ratio thereof to said resin obtained from the diglycidyl ether of bisphenol A ranging from 0.05:5 to 0.6:5 as expressed in parts by weight.

* * * * *